March 1, 1955  M. KLAAR  2,702,969

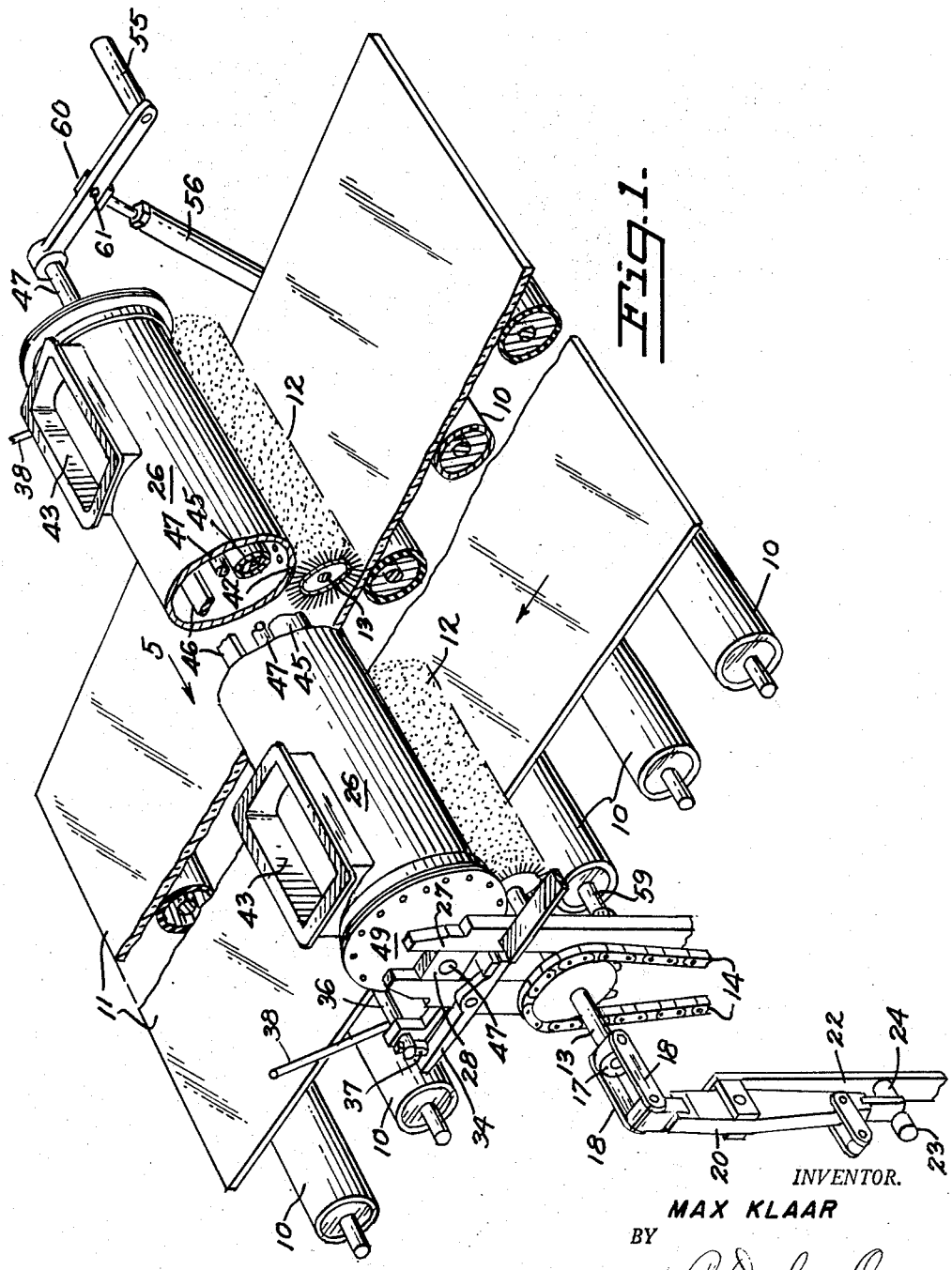

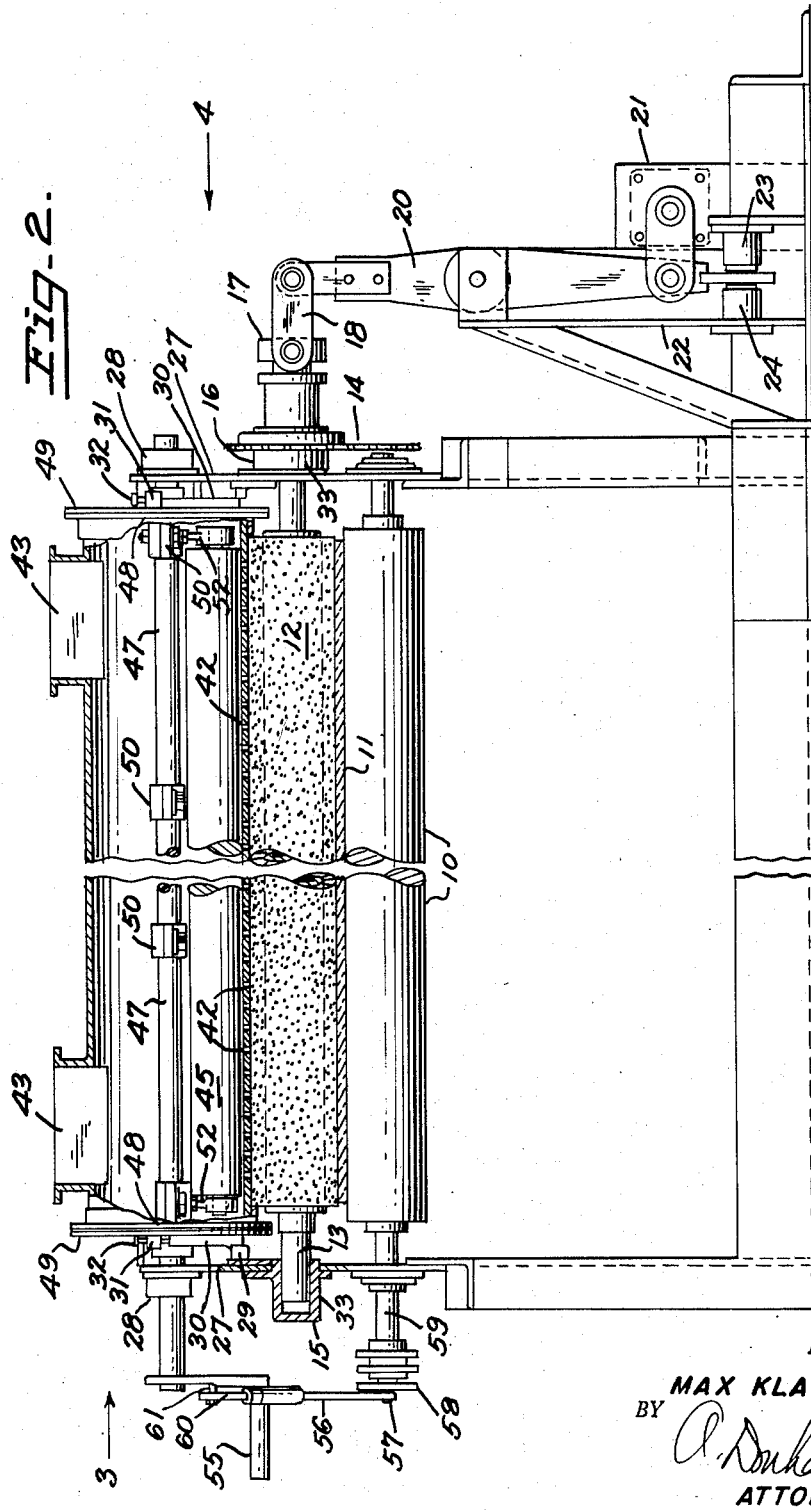

MIRROR MAKING APPARATUS

Filed Oct. 26, 1951  3 Sheets-Sheet 3

INVENTOR.
MAX KLAAR
BY
ATTORNEY

United States Patent Office 2,702,969
Patented Mar. 1, 1955

2,702,969

MIRROR MAKING APPARATUS

Max Klaar, San Mateo, Calif., assignor to W. P. Fuller & Co., San Francisco, Calif., a corporation of California Application October 26, 1951, Serial No. 253,339

9 Claims. (Cl. 51—22)

This invention relates to improvements in automatic mirror making machines and has particular relation to a device for cleaning the glass preparatory to application of the silvering solution. Prior to the invention described herein, the cleaning of the glass to remove any dirt or imperfections was done by hand.

This machine is adapted for use as one unit in a completely automatic mirror making machine in which no human hands are employed from the time the glass sheet is placed on the feeder conveyor until the finished mirror is lifted off the conveyor at the end of the machine. It is part of the solution of the problem of making mirrors of uniform quality as it is independent of the skill of any individual mirror maker. Also, it is part of the answer to the problem of the previous high cost of mirrors and to the problem of increasing the volume of output of mirrors.

The object of this machine is to provide means for applying a uniform amount of cleaning compound to the whole upper face of the glass sheet without injuring the delicate surface that is to be silvered.

Other objects and advantages will appear from the following description, a preferred form of the device.

In the drawings:

Fig. 1 is an isometric view of the principal portions of the device, partly in section with a central portion broken away;

Fig. 2 is a front view in elevation, with a central portion broken away, and looking toward the discharge side of the rouge applicator;

Figure 4:
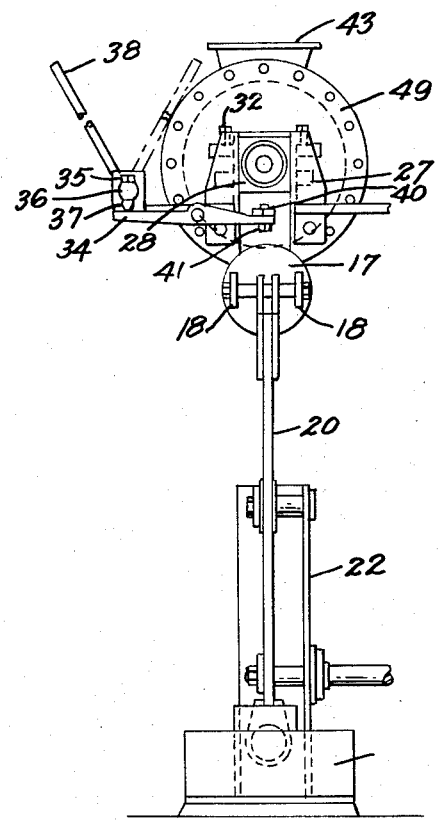
Fig. 4 is an end view of the device looking in the direction of the arrow 4 in Fig. 2.

The device of the present invention is particularly adapted to be placed at or near the loading platform of an automatic mirror making machine so that it can act on the top side of the sheet of glass at or near the outset of the cleaning operations. It is in these cleaning operations that the surface to be silvered is prepared to receive the silver coating to make the mirror. Any imperfection in the glass surface is brought out by the silver coating, hence the importance of having the glass surface perfectly clean.

The device of the present invention gently brushes the glass surface with a cleaning compound thereby tending to remove any finger prints or dirt particles from the surface of the glass. The next step in the cleaning operation is application of a detergent, but this constitutes no part of the present invention. In the complete machine the detergent spray and brushing mechanism is set over the conveyor table close to the rouge applicator, but that mechanism is omitted from the attached drawings.

In Fig. 1 of the drawings, the conveyor table for the glass sheets is shown made up of a plurality of spaced apart rollers 10, which rollers are driven by mechanism not shown whereby the glass sheets 11 are conveyed from one end of the machine to the other. These sheets may be of any size usual in making mirrors for all purposes. The operator feeds them onto the conveyor at the loading end and another operator lifts them off as completed mirrors at the unloading end. In the interim no hand has touched them, thereby removing one of the big drawbacks in the past to consistently high quality mirror manufacturing, namely, the human equation. The present invention plays an important part in achieving this new result.

The problem in rouging has been to apply uniformly to the whole surface of the mirror a correct amount of properly mixed cleaning compound to remove from the surface every bit of foreign matter. In the present invention the cleaning compound is applied to the glass sheet 11 by the brush 12 mounted on the shaft 13 and driven in the direction indicated by the arrow by a drive chain or like drive 14. The bearings 15 and 16 for the shaft permit it an endwise oscillation which is effected by the collar 17, links 18 and lever 20. A gear reducer unit 21 at the base of the frame 22 moves the lever 20 between the shock absorbers 23 and 24. This mechanism oscillates the brush crosswise in one direction or the other while it is being rotated and accomplishes a continuous even transfer of the abrasive 25 from the abrasive hopper 26 to the glass sheet; and an evening out of the abrasive on the surface of the sheet. The abrasive is preferably applied in the form of a wet paste, although a fine dry powder or even a thick slurry may sometimes be used, as is well known in the art. The speed of rotation of the brush is preferably 4.7 R. P. M. which in feet per minute is about three times faster than the travel of the glass sheet under the rouger. The latter travels at about 30 inches per minute.

It is important to have an even feed of the cleaning compound 25 to the applicator brush 12 and this is accomplished by mounting the hopper 26 adjustably in end frames 27 so that the desired area of contact between the brush and the bottom of the hopper can be obtained. This adjustable mounting for the hopper 26 includes the blocks 28 slidable vertically in the end frames 27. Secured on the inside of each end frame is an extension 29 with upwardly projecting portions 30 the top flat surfaces 31 of which form a resting place for the bottom of four adjusting screws 32 which regulate the separation between the hopper and the applicator brush to compensate for the wear of the brush.

Figure 3:
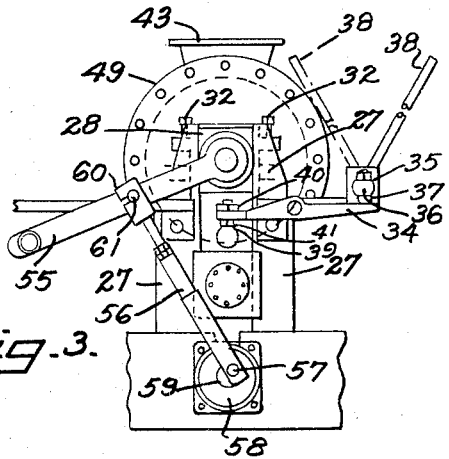
Fig. 3 is an end view of the device looking in the direciton of the arrow 3 in Fig. 2.

The adjustable mounting for the brush 12 includes the bearing blocks 33 slidable vertically in the end frames 27. On each end is a lever 34, each secured at one end to its adjacent bearing block 33 and having its other end in contact with a cam arrangement 35 consisting of a cross rod 36 with an adjustable arm 37 and a lifting arm 38. The connection 39 of the lever 34 to the block 33 is also adjustable by means of the nuts 40, 41 which compensate for the wearing of the brush. The operation of the handle 38 as shown in Fig. 3 accommodates the varying thickness of glass sheet being processed. When the handle 38 is in the position shown in Fig. 3, the brush 12 is in position for the heavier glass. When the handle 38 is in the dotted position shown in Fig. 3, the brush is in position for the thinner glass.

The hopper 26 is shown as cylindrical in cross section (see Fig. 5) having spaced apart outlet holes 42 in its bottom edge through which the abrasive passes. Two filling spouts 43 are shown as these have adequate capacity considering the slow rate at which the abrasive is used up. To keep the abrasive 25 in good condition for flowing and to force it through the feed holes 42 onto the brush, a roller 45 and a blade 46 are secured to a shaft 47 mounted in the blocks 28. This shaft also passes through holes 48 in the ends 49 of the hopper so as to support it in the blocks 28. The roller 45 and the blade 46 are secured to the shaft 47 by means of the several brackets 50 rigidly secured to rotate with the shaft 47 and each intermediate bracket 50 with an arm 51 to which the blade 46 is bolted and each end one with an arm 52 in which the shaft 53 for the roller 45 is journaled.

The shaft 47 is moved by the crank 55. When the attendant is ready to place the rouger in operation he will move the crank back and forth and around sufficiently to mix up and to distribute the abrasive in the hopper. Occasionally, while the machine is in use he may repeate the above, especially if he finds it necessary to add abrasive through one or both of the filler spouts 43. Once the abrasive is distributed and while the machine is running it is desirable to maintain a slow back and forth motion on the blade 46 and the roller 45 in the hopper. Moving the blade keeps the abrasive from collecting on the inner wall and movement of the roller over the holes 42 feeds the abrasive to the brush 12 in the varying amounts needed for the operation. The roller 45 acts as a shut-off valve for the cleaning compound when directly over the holes 42.

A mechanism for accomplishing the above back and forth swinging or rolling motion is shown in Figs. 1, 2, and 3 and includes a link 56 journaled at 57 to a crank flange 58 on the driven shaft 59, for one of the rolls 10. The link 56 at its other end has a hook or latch means 60 adapted to engage a pin 61 in the side of the crank 55. The arm of the crank 58 is shorter than the distance from the shaft 47 to the pin 61 so that rotation of the crank 58 through 360 degrees will cause a very short rotation of the shaft 47. This rotation being adjustable by the arm 56 and by repositioning the pin 61 on the arm 55. Adjustments to arms 55 and 56 will supply the required amount of cleaning compound necessary in the varying operations. By having the latch 60 the operator can disconnect the crank 55 from the link 56 when it is necessary for him to manipulate the crank 55 manually.

*Operation*

Figure 5:
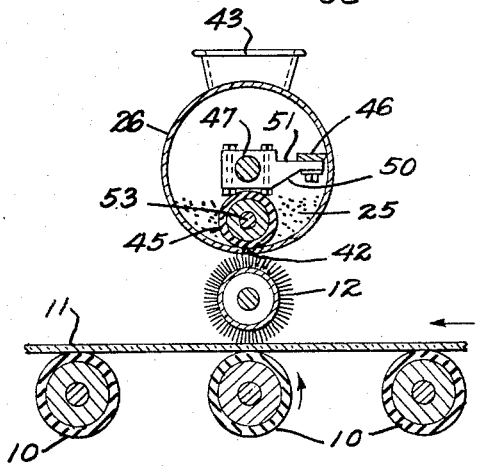
Fig. 5 is a view in cross section taken in the direction of the arrow 5 in Fig. 1.

A good idea of all that is going on when the rouger is operating can be gained by looking first at Fig. 5. The glass sheet 11 is being propelled to the left by the driven conveyor rollers 10. The rouge applicator 12 is both rotating in a counterclockwise direction and moving crosswise to the glass sheet as it treats the surface. The applicator and scrubbing brush 12 picks up the cleaning compound in the specially designed magazine that distributes the cleaning compound evenly; the compound being fed by the roller 45 through the holes 42. The oscillatory and rotational movement of the applicator assures that every bristle will receive its share of the rouge supplied. Movement of the blade 46 assures the operator that the rouge in the hopper will be moved down into range of the roller 45. Oscillation of the applicator is accomplished by means of the lever mechanism 20 in Fig. 2, and the back and forth movement of the blade 46 and roller 45 is accomplished by the link 56 and cranks 55 and 58, also shown in Fig. 2.

The net effect on the glass sheet of passing under the cleaning compound applicator and scrubbing brush just prior to being washed thoroughly is that any dirt, glue, fingerprints, or other foreign matter which have adhered to the glass sheet between the time of its manufacture and the time it is treated by this machine will be removed, and the upper glass surface on which the silver coating is to be applied will be thoroughly cleaned over its whole area.

While the present form of the machine works satisfactorily, the form may be changed without departing from the combination of elements which produce this new result.

What we claim is:

1. In a machine for cleaning flat surfaces the combination of a rotatable cleaner applying means; means for oscillating said cleaner applying means back and forth along its axis while it is rotating; means for conveying the material to be cleaned in contact with said cleaner applying means; a feeding hopper for cleaning compound having its feed outlets in contact with said cleaner applying means; adjusting means for vertically positioning said hopper, and a swinging presser means inside the hopper, in rolling contact with the hopper wall, to force said cleaning compound through said feed outlets.

2. The device of claim 1 in which said hopper also has inside it a swinging scraper means to mix any hardening cleaning compound, as well as added fresh compound, with the existing cleaning compound.

3. In a machine for preparing glass sheets for mirror making, the combination of continuously rotating cylindrical cleaner applying means; means for propelling a succession of glass sheets in contact with said cleaner applying means; means for shifting the aforesaid two means sidewise relative to each other and relative to the general forward movement of said glass sheets; a feed hopper for cleaning compound in contact with said cleaner applying means having feed outlets across which said last named means is moved laterally as it also is rotated; and a swinging pressure means inside the hopper, in rolling contact with the hopper wall, to force said cleaning compound through said feed outlets.

4. In a machine for preparing glass sheets for mirror making, the combination of continuously rotating cylindrical cleaner applying means; means for propelling a succession of glass sheets in contact with said cleaner applying means; a feed hopper for cleaning compound in contact with said cleaner applying means having feed outlets; a rolling presser means swingably mounted inside the hopper to force said cleaner through said outlets and means for shifting sidewise in a oscillatory motion said cleaning means relative to said glass sheets and said cleaning means relative to said feed outlets; whereby no feed outlet is successively in contact with a surface on said cleaner applying means lying in a plane normal to the axis of the latter and no radial portion of the surface of said cleaner applying means lying in a plane normal to its axis will successively contact a portion of said glass sheet along a line coincident with its forward line of travel.

5. In a machine for the preparation of sheet glass stock for the manufacture of mirrors, the combination of a frame; a conveyor supported thereon for continuously moving sheets of glass therealong; a cylindrical cleaner applying roller extending generally crosswise in relation to the path in which said sheets of glass move; means for rotating said roller and for simultaneously oscillating it back and forth along its axis; a cylindrical hopper, mounted in said frame in a position coaxial to said roller, having feed outlets in alignment with the area of its contact with said cleaning roller; vertically adjustable mounting means for said hopper; a shaft mounted in the ends of said hopper; brackets secured to said shaft; a roller secured to said brackets adapted to roll adjacent the inside wall of said hopper to push cleaning material contained in the hopper through said feed outlets; a crank secured to said shaft; and means for imparting a reciprocatory motion to said crank and shaft; whereby a predetermined amount of cleaning compound will be deposited over the whole surface of said cleaning roller through said feed outlets and will be evenly transferred and applied on the surface of said sheet glass stock with a generally circular motion.

6. The device of claim 5 with a scraper blade mounted in said hopper on said bracket, whereby any hardened cleaning compound will be scraped from the inner surface of said hopper and will mix the fresh cleaning compound with the existing compound in said hopper to give the proper consistency.

7. In a machine for the preparation of sheet glass stock for the manufacture of mirrors, the combination of a conveyor for continuously moving sheets of glass therealong; a cylindrical cleaner applying roller mounted transverse to the direction of glass movement; means for rotating said roller and for simultaneously oscillating it back and forth along its axis; a cylindrical hopper mounted in axial alignment and in contact with said cleaning roller, having feed outlets in the area of its contact with said cleaning roller; a shaft mounted in the ends of said hopper having arms extending therefrom; and a rolling presser means secured to said arms adapted to swing adjacent the inside wall of said hopper to push cleaning material through said feed outlets; whereby a predetermined amount of cleaning compound will be deposited over the whole surface of said cleaning roller through said feed outlets and will be evenly transferred and applied on the surface of said sheet glass stock with a generally circular motion.

8. In a machine for cleaning flat surfaces, the combination of a rotatable cleaner applying means; means for oscillating said cleaner applying means back and forth along its axis while it is rotating; means for conveying the flat surface to be cleaned in contact with said cleaner applying means, a feeding hopper for cleaning compound having feed outlets in contact with said cleaner applying means; a shaft mounted in the ends of said hopper; a roller secured to said shaft, and spaced on arms to one side thereof, adapted to roll adjacent the inside wall of said hopper to force said cleaning compound through said feed outlets; and means for imparting a reciprocatory-rotary motion to said shaft and to said roller; whereby said cleaning compound will be deposited at a predetermined rate through said feed outlets over the surface of said cleaner applying means.

9. The device of claim 8 with a scraper means also secured to said shaft in said hopper, whereby any hardened cleaning compound will be scraped from the inner surface of said hopper and will mix the fresh cleaning compound with existing compound in said hopper to give proper consistency.

References Cited in the file of this patent

UNITED STATES PATENTS

| Number | Name | Date |
|---|---|---|
| 101,479 | Lyons | Apr. 5, 1870 |
| 451,263 | Buckman | Apr. 28, 1891 |
| 492,099 | Nelson | Feb. 21, 1893 |
| 550,806 | Thomas | Dec. 3, 1895 |
| 620,085 | Burson | Feb. 21, 1899 |
| 1,622,880 | Perkins | Mar. 29, 1927 |
| 1,685,757 | Storck | Sept. 25, 1928 |
| 1,853,611 | Healy | Apr. 12, 1932 |
| 1,915,323 | Lane | June 27, 1933 |
| 2,182,276 | Blood | Dec. 5, 1939 |
| 2,200,592 | Coddington | May 14, 1940 |